(12) United States Patent
Falsetti et al.

(10) Patent No.: US 9,259,962 B2
(45) Date of Patent: Feb. 16, 2016

(54) INTEGRATED HUB-BEARING ASSEMBLY FOR THE WHEEL OF A MOTOR VEHICLE

(71) Applicants: Fabio Falsetti, Turin (IT); Kenneth C Fegely, Jr., Walled Lake, MI (US); Alfredo Monetti, Pinerolo (IT); Marc Schollmeyer, StAlbans (GB)

(72) Inventors: Fabio Falsetti, Turin (IT); Kenneth C Fegely, Jr., Walled Lake, MI (US); Alfredo Monetti, Pinerolo (IT); Marc Schollmeyer, StAlbans (GB)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/691,906

(22) Filed: Dec. 3, 2012

(65) Prior Publication Data

US 2013/0147258 A1  Jun. 13, 2013

(30) Foreign Application Priority Data

Dec. 9, 2011 (IT) .............................. TO2011A1127

(51) Int. Cl.
| | |
|---|---|
| *F16C 13/00* | (2006.01) |
| *B60B 25/00* | (2006.01) |
| *B60B 3/14* | (2006.01) |
| *B60B 27/00* | (2006.01) |
| *F16C 19/18* | (2006.01) |
| *F16C 19/50* | (2006.01) |

(52) U.S. Cl.
CPC ............... *B60B 3/142* (2013.01); *B60B 27/001* (2013.01); *B60B 27/0026* (2013.01); *B60B 27/0042* (2013.01); *B60B 27/0084* (2013.01); *B60B 27/0094* (2013.01); *B60B 2310/305* (2013.01); *B60B 2380/12* (2013.01); *B60B 2900/113* (2013.01); *B60B 2900/541* (2013.01); *B60Y 2200/114* (2013.01); *B60Y 2410/102* (2013.01); *F16C 19/186* (2013.01); *F16C 19/505* (2013.01); *F16C 2326/02* (2013.01)

(58) Field of Classification Search
CPC . F16C 19/186; F16C 19/187; B60B 27/0005; B60B 27/001; B60B 27/0026; B60B 2310/305
USPC ......... 384/544, 589; 301/35.53–35.58, 35.61, 301/35.63, 105.1, 111.01
See application file for complete search history.

(56) References Cited

U.S. PATENT DOCUMENTS

| | | | | |
|---|---|---|---|---|
| 1,206,889 | A | * | 12/1916 | Murray ...................... 301/105.1 |
| 2,173,043 | A | * | 9/1939 | Roper ........................ 301/35.58 |
| 4,299,425 | A | | 11/1981 | Renz et al. |
| 4,354,711 | A | * | 10/1982 | Main ......................... 301/35.63 |
| 5,211,448 | A | * | 5/1993 | Hayashi .................... 301/35.55 |
| 5,636,905 | A | | 6/1997 | Pagacz |

(Continued)

FOREIGN PATENT DOCUMENTS

| | | |
|---|---|---|
| DE | 102011011005 A1 | 9/2011 |
| EP | 2380750 A1 | 10/2011 |
| JP | 3262702 A | 11/1991 |

*Primary Examiner* — Adam D Rogers
(74) *Attorney, Agent, or Firm* — Bryan Peckjian; SKF USA Inc. Patent Dept.

(57) ABSTRACT

An asymmetrical hub bearing assembly for the wheel of a motor vehicle provides a flanged hub rotatable around an axis of rotation (x), a flange transversal to the axis (x), an outer ring with raceways axially spaced from one another, and two rows of balls, of which the axially outer row has a pitch circle with a diameter greater than that of the axially inner row. The flanged hub includes a tubular portion which protrudes in the axially outer direction beyond the flange and provides a thread for a single central threaded fastener adapted to releasably lock a wheel on the hub.

11 Claims, 1 Drawing Sheet

(56) References Cited

U.S. PATENT DOCUMENTS

| | | | |
|---|---|---|---|
| 5,820,224 A * | 10/1998 | Dimatteo, Jr. | 301/35.58 |
| 5,887,952 A * | 3/1999 | Gandellini | 301/35.63 |
| 5,901,818 A * | 5/1999 | Martino | 188/218 XL |
| 6,106,076 A * | 8/2000 | Gandellini | 301/35.55 |
| 6,550,975 B2 * | 4/2003 | Inoue et al. | 384/537 |
| 7,104,695 B2 | 9/2006 | Shevket | |
| 7,255,482 B2 * | 8/2007 | Yamamoto | 384/544 |
| 8,215,846 B2 * | 7/2012 | Hirai | 384/544 |
| 2009/0232435 A1 | 9/2009 | Ohtsuki | |

\* cited by examiner

INTEGRATED HUB-BEARING ASSEMBLY FOR THE WHEEL OF A MOTOR VEHICLE

CROSS-REFERENCE TO RELATED APPLICATION

This US Non-Provisional Utility application claims the benefit of copending Italy Provisional Patent Application Serial No. TO2011A001127 filed on Dec. 9, 2011, which is incorporated herein in its entirety.

FIELD OF THE INVENTION

The present invention relates to an integrated hub bearing for the wheel of a motor vehicle, and particularly to an integrated assembly that provides an asymmetric hub bearing assembly for a motor vehicle wheel, the assembly having a rotation axis (x) and a flanged hub rotatable about the axis.

BACKGROUND OF THE INVENTION

U.S. Pat. No. 7,104,695 B2 discloses an asymmetrical hub bearing assembly, comprising a hub with a flange extending radially outwardly from an axial end for mounting the wheel of a vehicle, an outer ring with axially spaced raceways, and a plurality of rolling elements arranged in two rows in the annular space between the outer ring and the hub. The pitch circle diameter of the row of rolling elements arranged at the axially outer side (outboard), adjacent to said flange, is greater than the diameter of the pitch circle of the rolling elements of the row on the axially inner side (inboard). Due to this arrangement, the distance between the pressure centers where the contact angle of the two bearing rows intercept the hub axis can be increased; this provides a higher camber stiffness. The outboard row intercepts the hub axis outboard of the hub flange, which balances the loads on the system more evenly between the inner and outer bearing rows. As an effect of the asymmetric arrangement, the outboard row can accommodate more rolling elements, and thus increase the load capacity of the bearing, at equal size of a symmetric unit. The asymmetric design allows to place the pressure center farther outboards than a symmetric unit, without having to increase the contact angle and without reducing the bearing capacity of the bearing in a radial direction. The asymmetrical arrangement, finally, increases the load bearing capacity without requiring modifications to the suspension strut of the vehicle.

The radial flange of the hub provides a number of holes to allow mounting of the vehicle wheel by means of bolts. The flange also has a flat radial surface, at the axially outer side, which defines a precise reference surface against which the brake disc and the wheel may rest. The hub also forms a centering annular projection which extends in the axially direction beyond the radial flange. This projection is designed to enable a preliminary support and centering of the wheel, before it is fixed, in a perfectly centered position, via the fastening bolts that are inserted through the holes of the flange.

With sports cars, a need is felt to have a single central threaded fastener to quicken the assembly and disassembly of the wheel. It is an object of the invention to provide an integrated hub-bearing unit assembly being compact, light-weight, allowing the wheel to be quickly mounted or removed that meets the needs of the industry.

BRIEF DESCRIPTION OF THE DRAWINGS

In order that the present invention may be well understood there will now be described a preferred embodiment thereof, given by way of example, reference being made to the accompanying drawings, in which.

DETAILED DESCRIPTION OF THE INVENTION

Figure 1:
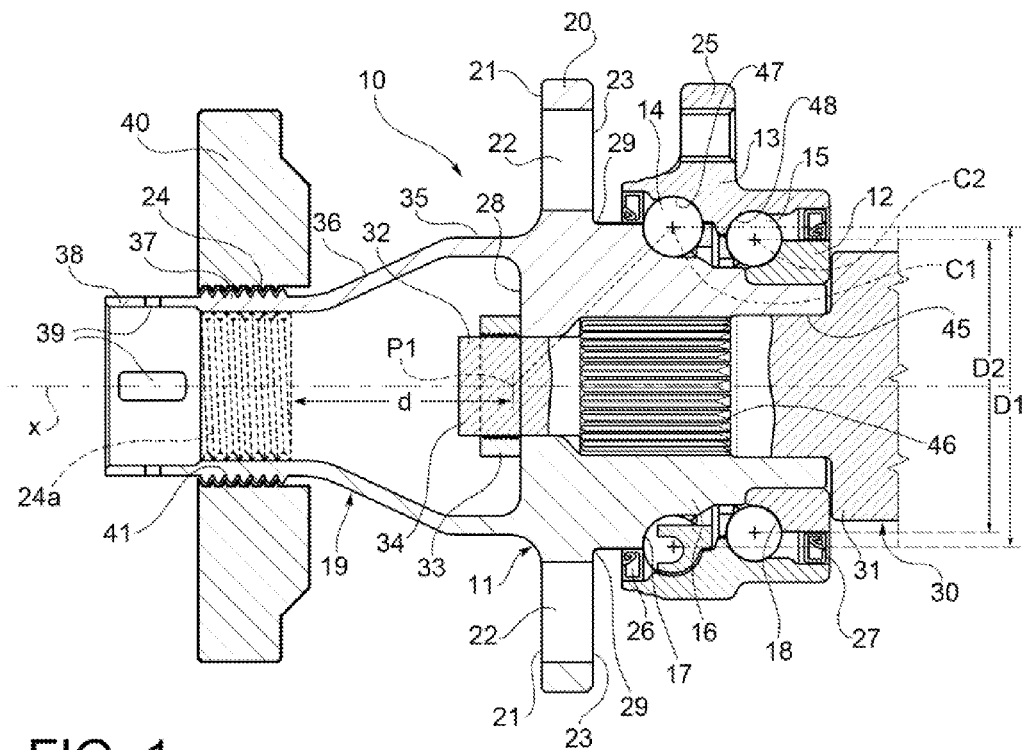
FIG. 1 is a view in axial section of a first embodiment of a hub-bearing assembly according to the invention.

Referring initially to FIG. 1, a flanged hub bearing unit according to a first embodiment of the invention is indicated as a whole at 10. The assembly 10 serves to rotatably mount a wheel (not shown) to the suspension strut (not shown) of a vehicle, around a central axis of rotation x. Throughout the present description and in the claims, terms and expressions indicating positions and directions such as "radial" and "axial" shall be construed as referring to the axis of rotation x of the bearing. Expressions such as "axially inner" and "axially outer" are referred to the mounted condition on the vehicle.

The hub bearing assembly 10 is of the asymmetric type and includes a flanged hub 11 rotatable about the axis x, a flange 20 integral with the flanged hub 11 and transverse to the axis x, a stationary ring 13 arranged radially outside of the flanged hub 11 and provided with respective raceways 47, 48 axially spaced from one another, and two rows 14, 15 of rolling elements arranged within the raceways between the stationary ring 13 and the flanged hub 11. The rows 14, 15 have respective pitch circles C1, C2 with respective diameters D1, D2 of which the diameter D1 of the pitch circle C1 of the row 14 of the rolling elements has axially outer dimensions greater than the dimensions of the diameter of the pitch circle C2 of the row 15 of axially inner rolling elements.

The hub 11 includes a radially inner tubular core 16, which integrally forms a radially inner raceway 17 for the row 14 of rolling elements arranged at the axially outer side (or "outboard" side), and an annular insert 12, which is fitted on the tubular core 16 and forms a radially inner raceway 18 for the row 15 of rolling elements arranged by the axially inner side (or "inboard" side). The rolling elements of the two rows 14, 15 are bearing balls, arranged between the stationary ring 13 and the flanged hub 11 according to the arrangement of a double row angular contact ball bearing.

The tubular core 16 is angularly coupled to a constant velocity joint 30 provided with a bell 31 and a grooved shaft 32. The shaft 32 is directly inserted, through the tubular core 16, in a cylindrical cavity 45 with axial splines 46. The shaft 32 is angularly coupled to the core by means of an outer spline for transmitting a driving torque from the joint to the hub. The shaft 32 is axially locked to the hub by means of a connecting nut 33 that is screwed on a projecting threaded end 34 of the shaft 32 and abuts against a radial surface 28 of the hub. The nut 33 clamps the bell 31 against the annular insert 12 and also determines a preload to the hub-bearing assembly 10.

The diameter of the pitch circle of the ball bearing 14 arranged at the outboard side is greater than the diameter of the pitch circle of the bearing balls 15 at the axially inner (inboard) side; the row of bearing balls 14 locates a center P1 of pressure on the x axis corresponding to the point where the lines of action of the forces, exchanged between the track 17 and each ball of the ball bearing 15, converge. An asymmetric arrangement of this kind is disclosed, for example, in U.S. Pat. No. 7,104,695 B2, which is herein incorporated by reference.

The hub 11 forms a radially outwardly extending flange 20 which provides a flat radial surface 21, at the axially outer side, defining a flat and accurate radial surface of reference, against which the disc brake and the wheel (not shown) may rest. Formed in the flange 20 are lightening holes 22 circumferentially distributed uniformly, preferably equally spaced. Advantageously, the holes 22 are through holes which inwardly on a flat part 23 of the radial surface on the axially inner side of the flange, with the advantages set out herein after.

The wheel is fastened to the hub by means of an axially extending tubular portion 19 that protrudes in the axially outer direction beyond the radial flange 20.

The tubular portion 19 of the hub comprises:
  a cylindrical proximal centering portion 35 connected directly to the flange 20;
  a conical portion 36, which is connected to the portion 35 and tapers away from this; and
  a distal portion 37 with an external thread 24, on which a single central threaded fastening element 40, adapted to lock the hub, can be screwed.

The tubular portion 19 is located at the axially outer side with respect to the flange 20, while the rows 14, 15 of rolling elements and the stationary ring 13 are on the opposite side, i.e. on the axially inner side with respect to the flange 20.

The tubular portion 19 of the hub also comprises a further cylindrical end portion 38 provided with through holes 39 adapted to receive self-locking elements (not shown) of the single central threaded fastener 40.

The axial length of the tubular portion 19 depends on the axial width of the wheel to be mounted. By suitably setting an axial distance d of an end portion of the internal thread 24 from the point P1, the overall stiffness of the entire assembly 10 can equally be set.

Figure 2:
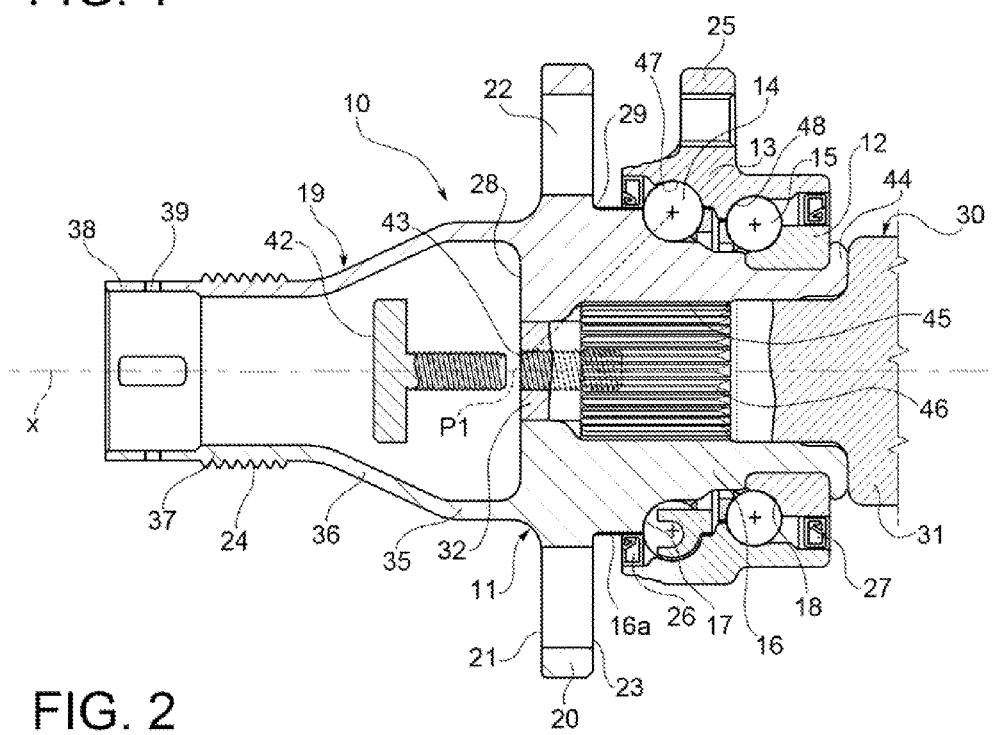
FIG. 2 is a view in axial section of a second embodiment of a hub-bearing assembly according to the invention.

Preferably, in the embodiment of FIGS. 1 and 2, where the diameter of the pitch circle of the outboard row of balls 14 is greater than the diameter of the pitch circle of the inboard row of bearing balls 15, the distance d being less than 45 mm.

In the embodiments of FIGS. 1 and 2, the thread 24 is formed on the outer cylindrical surface 37 of the tubular portion 19, and the fastener 40 has therefore a corresponding thread 41 formed in its central hole.

In an alternative embodiment of the assembly 10 (shown in dashed line in FIG. 1), the thread 24a is formed on the inner cylindrical surface of the axial cavity of the tubular portion 19, and a single fastener (not shown), similar to the fastener 40, has a stem with an outer thread. This arrangement is advantageous because the fastener occludes most of the open end of the tubular portion 19, opposing the entry of contaminants such as water, dust, mud and, moreover, allows to get rid of the cylindrical end portion 38. The function of the holes 39 and related elements unscrewing of portion 38 can be accomplished by other devices not shown.

The outer ring 13 provides, in a per se known manner, a radially outer flange 25 for fastening to a suspension standard of the vehicle. Two conventional sealing devices 26, 27, in this example of the cassette type, are provided at the opposite axial ends of the outer ring 13, one on the outboard side between the outer ring 13 and the hub 11, and the other on the inboard side between the outer ring 13 and the annular insert 12.

In the embodiment of FIG. 2, the annular insert 12 is not axially locked during assembly of the constant velocity joint 30, but is axially locked by means of an end edge 44 of the hub, which is cold formed, preferably by orbital rolling. In this way, the axial preload of the assembly is made completely independent of the assembly step preformed afterwards. The constant velocity joint 30 is axially locked to the hub by means of a screw connection 42 which engages in a threaded hole 43 of the shaft 32 and abuts against a radial surface 28 of the hub, thus tightening the bell 31 against the rolled edge 44 of the hub.

Due to the rolled edge 44, the assembly of the constant velocity joint is dispensed with having to apply an axial preload to the bearing. This allows the use of a screw connection 42 having an outer size smaller than the outer size of the nut 33 described above, with the immediate advantage of being able to reduce the sizes, preferably the diametrical ones, of the entire tubular portion 19 by at least 30% with consequent benefits in terms of weight and bulk reduction without, however, affecting rigidity and performance.

Due to the hub being of the asymmetric design as described above, the hub bearing assembly has a greater stiffness. As the vehicle runs along a bend, the greater above-mentioned stiffness implies a minor deflection of the flange in the area where this is joined to the tubular core hub. This allows to reduce significantly the fillet radius 29 between the flange 20 and the tubular core 16, so that the radial surface 23 of the axially inner side of the flange may extend flat to a greater extent as compared to the prior art; in other words, the flat part of the surface 23 extends closer to the tubular core of the hub and the central axis x of the assembly.

The flat surface 23 allows to conveniently form the through lightening holes 22 directly and simply with a single drilling operation, making them of the required diameter. Otherwise, a conventional, large fillet radius would require to form the lightening holes through a first drilling step to make small holes having a smaller diameter than the final diameter required, and a second, expensive milling operation in case the lightening holes 22 should reach diameters equal to those as described herein.

The significant reduction of the radius of the fillet 29 between the flange 20 and the tubular core 16 does not only have a positive effect on the greater extension of the radial surface 23 on the axially inner side of the flange 20, but also on a greater extension of an outer cylindrical surface 16a of the tubular core 16, immediately adjacent to the flange 20. In other words, the portion of the cylindrical surface 16a extends closer to the flange 20 allowing, therefore, to fix the outboard side sealing device 26 in a position immediately adjacent to the flange 20, and, also, to obtain a greater degree of axial compactness of the assembly 10, which results in bringing the flange 25 axially closer to the flange 20.

It will be appreciated that, besides avoiding an expensive milling of the lightening holes, these can be made of a wider diameter than in the past, thanks to the greater stiffness of the asymmetrical bearing assembly with respect to a symmetric bearing assembly. Similarly, the flange can be dimensioned thinner, further reducing the inertia of the rotating hub.

While a few exemplary embodiments have been disclosed in the foregoing detailed description, it should be appreciated that a vast number of variations exist. It should also be appreciated that the exemplary embodiments are only illustrative examples, and are not intended to limit the scope, applicability, or configuration in any way. Rather, the drawings and he foregoing detailed description will provide those skilled in the art with a convenient road map for implementing the invention, it being understood that various changes may be made in the function and arrangement of elements described in an exemplary embodiment without departing from the scope as set forth in the appended claims and their legal equivalents.

The invention claimed is:

1. An asymmetric hub bearing assembly for a motor vehicle wheel having an axis of rotation, the assembly comprising:
   a flanged hub rotatable about the axis of rotation and configured for mounting to a constant velocity joint;
   a flange integral with the flanged hub and transversal to the axis of rotation, the flange having a plurality of holes extending axially therethrough which are configured to lighten the flange, the flange having an axially inner end and an axially outer end formed by first and second radially extending surfaces, respectively, the first radially extending surface being connected to an axially extending surface of the flanged hub via a portion of an outer surface of the flanged hub extending through a fillet radius;
   a stationary bearing ring arranged radially outwardly of the flanged hub and providing raceways axially spaced from one another, the stationary bearing ring comprising a radially outer flange defining a bore therethrough configured for mounting the stationary bearing ring to a vehicle suspension;
   two rows of rolling elements, comprising an axially outer row of rolling elements and an axially inner row of rolling elements, arranged between the stationary bearing ring and the flanged hub, the rolling elements having pitch circles with respective diameters, of which the diameter of the pitch circle of the axially outer row of rolling elements has a size greater than the size of the diameter of the pitch circle of the axially inner row of rolling elements, wherein a diameter of one of the plurality of holes radially overlaps both the bore and one of the rolling elements in the axially outer row of rolling elements, an axial length of the axially extending surface located between the axially outer row of rolling elements and the portion of the outer surface being greater than a radial distance between the axially extending surface of the flanged hub and a closest portion of a perimeter of the one of the plurality of holes;
   an annular insert positioned on the flanged hub and radially inward of the stationary bearing ring, the annular insert providing a first radially inner raceway for the axially inner row of rolling elements, the annular insert comprising a free radially extending surface such that the flanged hub does not overlap any of the free radially extending surface of the annular insert and such that the flanged hub does not prevent axial inward movement of the annular insert;
   the flanged hub integrally forming a second radially inner raceway for the axially outer row of rolling elements;
   the flanged hub provides a tubular portion which projects in an axially outer direction beyond the flange and is configured to engage a fastening element for releasably locking the wheel on the hub;
   the tubular portion comprising a hollow recess such that access is provided to a connecting nut positioned adjacent to the flanged hub, the connecting nut being configured to secure the assembly to a shaft; and
   wherein the free radially extending surface of the annular insert protrudes axially inward beyond the flanged hub so that the free radially extending surface is configured to engage the constant velocity joint such that engagement and adjustment of the connecting nut with the shaft determines a preload to the two rows of rolling elements of the assembly when the flanged hub is connected to the constant velocity joint.

2. An asymmetric hub bearing assembly for a motor vehicle wheel having an axis of rotation, the assembly comprising:
   a flanged hub rotatable about the axis of rotation and configured for mounting to a constant velocity joint;
   a flange integral with the flanged hub and transversal to the axis of rotation, the flange having a plurality of holes extending axially therethrough which are configured to lighten the flange, the flange having an axially inner end and an axially outer end formed by first and second radially extending surfaces, respectively, the first radially extending surface being connected to an axially extending surface of the flanged hub via a portion of an outer surface of the flanged hub extending through a fillet radius;
   a stationary bearing ring arranged radially outwardly of the flanged hub and providing raceways axially spaced from one another, the stationary bearing ring comprising a radially outer flange defining a bore therethrough configured for mounting the stationary bearing ring to a vehicle suspension;
   two rows of rolling elements, comprising an axially outer row of rolling elements and an axially inner row of rolling elements, arranged between the stationary bearing ring and the flanged hub, the rolling elements having pitch circles with respective diameters, of which the diameter of the pitch circle of the axially outer row of rolling elements has a size greater than the size of the diameter of the pitch circle of the axially inner row of rolling elements, wherein a diameter of one of the plurality of holes radially overlaps both the bore and one of the rolling elements in the axially outer row of rolling elements, an axial length of the axially extending surface located between the axially outer row of rolling elements and the portion of the outer surface being greater than a radial distance between the axially extending surface of the flanged hub and a closest portion of a perimeter of the one of the plurality of holes;
   an annular insert positioned on the flanged hub and radially inward of the stationary bearing ring, the annular insert providing a first radially inner raceway for the axially inner row of rolling elements, the annular insert comprising a free radially extending surface such that the flanged hub does not overlap any of the free radially extending surface of the annular insert and such that the flanged hub does not prevent axial inward movement of the annular insert;
   the flanged hub integrally forming a second radially inner raceway for the axially outer row of rolling elements;
   the flanged hub provides a tubular portion which projects in an axially outer direction beyond the flange and is configured to engage a fastening element for releasably locking the wheel on the hub;
   the tubular portion comprising a hollow recess such that access is provided to a connecting nut positioned adjacent to the flanged hub, the connecting nut being configured to secure the assembly to a shaft, the tubular portion including: a centering portion, a conical portion, and a distal portion, the centering portion having a cylindrical shape and extending from a radial surface of the flanged hub, the conical portion having a conical shape and extending between the centering portion and the distal portion such that the conical shape tapers inwardly from the centering portion toward the distal portion, the distal portion having a cylindrical shape;

the fastening element configured for engagement to the distal portion of the tubular portion and configured to secure the wheel between the flange and the fastening element; and wherein the free radially extending surface of the annular insert protrudes axially inward beyond the flanged hub so that the free radially extending surface is configured to engage the constant velocity joint such that engagement and adjustment of the connecting nut with the shaft determines a preload to the two rows of rolling elements of the assembly when the flanged hub is connected to the constant velocity joint.

3. The assembly according to claim 2, wherein the connecting nut is located entirely axially within the centering portion of the tubular portion, the conical portion and the distal portion being free of material therein to facilitate access to the connecting nut.

4. The assembly according to claim 2, wherein a thread is formed on the outer surface of the distal portion.

5. The assembly according to claim 2, wherein
the flanged hub provides a radially inner tubular core with a cylindrical through cavity with axial grooves to engage a portion of the shaft of the constant velocity joint such that the flanged hub and constant velocity joint rotate together, and that
the tubular portion surrounds a radial surface providing an axial abutment for the connecting nut applicable for axially locking the portion of the shaft with respect to the flanged hub.

6. The assembly according to claim 2, wherein the tubular portion being configured such that when the connecting nut secures a position of the flanged hub to the constant velocity joint, neither the connecting nut nor the shaft located therethrough extend axially from the flanged hub beyond the centering portion.

7. The assembly according to claim 6, wherein the tubular portion includes a linear surface which projects in the outer axial direction beyond the distal portion, the linear surface provides at least one through hole that is oriented transverse to the axis of rotation.

8. The assembly according to claim 2, wherein the rolling elements of the two rows are bearing balls fitted between the stationary ring and the flanged hub according to the arrangement of a double row angular contact ball bearing.

9. The assembly according to claim 2, wherein the tubular portion is located on the axially outer side with respect to the flange, and that the two rows of rolling elements and the stationary ring are located on the axially inner side with respect to the flange.

10. The assembly according to claim 2, wherein the tubular portion being configured such that when the connecting nut secures the flanged hub to the constant velocity joint the connecting nut does not extend axially from the flanged hub beyond the centering portion and the conical portion of the tubular portion.

11. The assembly according to claim 2, wherein the connecting nut is located entirely axially within the centering portion of the tubular portion, the conical portion being free of material therein to facilitate access to the connecting nut.

\* \* \* \* \*